United States Patent
Nalbach et al.

(10) Patent No.: US 12,320,783 B2
(45) Date of Patent: Jun. 3, 2025

(54) METHOD AND DEVICE FOR PREPARING A TENSILE TEST

(71) Applicant: TECHNISCHE UNIVERSITAET WIEN, Vienna (AT)

(72) Inventors: Mathis Nalbach, Vienna (AT); Philipp Thurner, Vienna (AT); Georg Schitter, Vienna (AT)

(73) Assignee: TECHNISCHE UNIVERSITAT WIEN, Vienna (AT)

( * ) Notice: Subject to any disclaimer, the term of this patent is extended or adjusted under 35 U.S.C. 154(b) by 258 days.

(21) Appl. No.: 18/001,019

(22) PCT Filed: Jun. 8, 2021

(86) PCT No.: PCT/AT2021/060199
§ 371 (c)(1),
(2) Date: Dec. 7, 2022

(87) PCT Pub. No.: WO2021/248171
PCT Pub. Date: Dec. 16, 2021

(65) Prior Publication Data
US 2023/0221228 A1    Jul. 13, 2023

(30) Foreign Application Priority Data
Jun. 8, 2020  (AT) .............................. A 50500/2020

(51) Int. Cl.
*G01N 3/14*     (2006.01)
*G01N 1/36*     (2006.01)
(Continued)

(52) U.S. Cl.
CPC ............... *G01N 3/14* (2013.01); *G01N 3/317* (2013.01); *G01N 2203/0017* (2013.01); *G01N 2203/0298* (2013.01)

(58) Field of Classification Search
CPC .. G01N 3/14; G01N 3/317; G01N 2203/0017; G01N 2203/0298; G01N 3/08;
(Continued)

(56) References Cited

FOREIGN PATENT DOCUMENTS

| CN | 101718656 A | * | 6/2010 |
| CN | 205138897 U |   | 4/2016 |

(Continued)

OTHER PUBLICATIONS

Van Der Rijt, J. et al., "Micromechanical testing of individual collagen fibrils," Macromolecular Bioscience, vol. 6, No. 9, Sep. 15, 2006, 6 pages.
(Continued)

*Primary Examiner* — Brandi N Hopkins
(74) *Attorney, Agent, or Firm* — McCoy Russell LLP

(57) ABSTRACT

The invention relates to a method for preparing a tensile test on an elongate, more particularly fibrous, specimen, for example on a collagen fibril, comprising the steps of:—providing the elongate specimen;—attaching a handling particle to the elongate specimen;—providing a force sensor, on which a retainer for the handling particle on the elongate specimen is disposed;—connecting a handling apparatus to the handling particle on the elongate specimen; and—connecting the handling particle on the elongate specimen to the retainer on the force sensor by means of the handling apparatus. The invention also relates to a method and a device for performing a tensile test on an elongate specimen.

15 Claims, 6 Drawing Sheets

(51) Int. Cl.
*G01N 3/08* (2006.01)
*G01N 3/317* (2006.01)

(58) Field of Classification Search
CPC .......... G01N 3/068; G01N 19/00; G01N 3/46; G01N 3/04; G01N 3/02; G01N 3/42; G01N 3/165; A61B 5/103; A61B 18/20; C09J 7/00; A61F 2/08; G01B 7/18; G09B 23/30; G01Q 60/38
See application file for complete search history.

(56) References Cited

FOREIGN PATENT DOCUMENTS

| | | | | |
|---|---|---|---|---|
| CN | 109556952 A | * | 4/2019 | ............... G01N 3/02 |
| DE | 2525479 A1 | | 1/1976 | |

OTHER PUBLICATIONS

Svensson, R. et al., "Viscoelastic behavior of discrete human collagen fibrils," Journal of the Mechanical Behavior of Biomedical Materials, vol. 3, No. 1, Jan. 2010, 4 pages.

Yang, L. et al., "Micromechanical analysis of native and cross-linked collagen type I fibrils supports the existence of microfibrils," Journal of the Mechanical Behavior of Biomedical Materials, vol. 6, Feb. 2012, 11 pages.

Savin, T. et al., "A method for tensile tests of biological tissues at the mesoscale," Journal of Applied Physics, vol. 111, No. 7, Apr. 13, 2021, 7 pages.

Chen, Z. et al., "Measuring flexural rigidity of mullite microfibers using magnetic droplets," Journal of Applied Physics, vol. 117, No. 21, Jun. 2015, 9 pages.

ISA European Patent Office, International Search Report Issued in Application No. PCT/AT2021/060199, Aug. 23, 2021, WIPO, 6 pages.

* cited by examiner

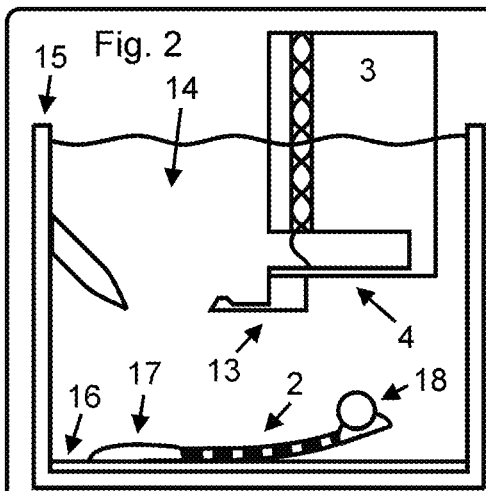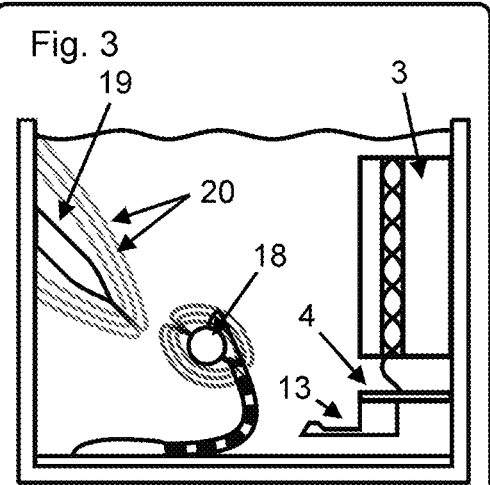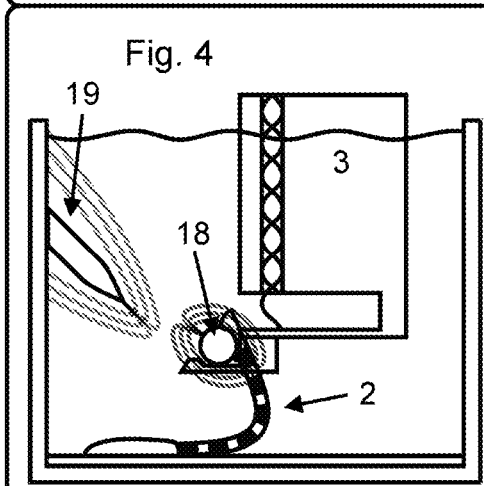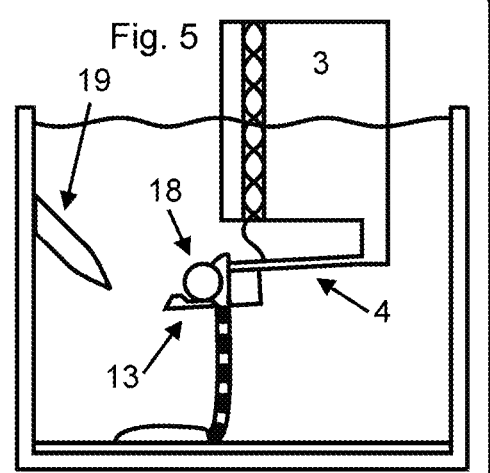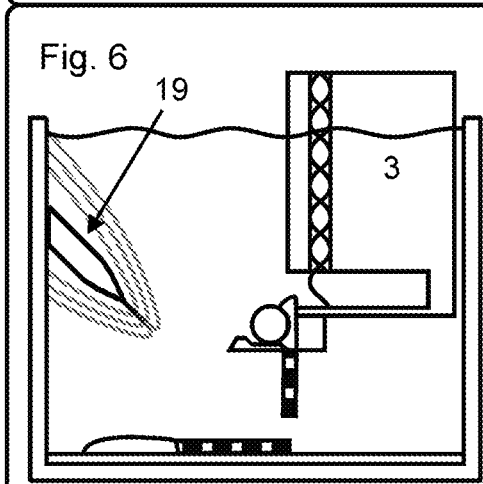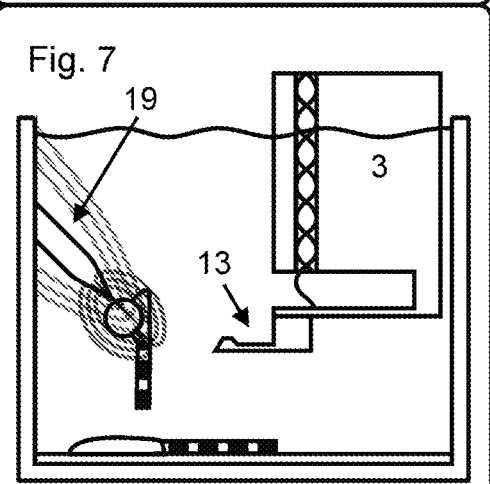

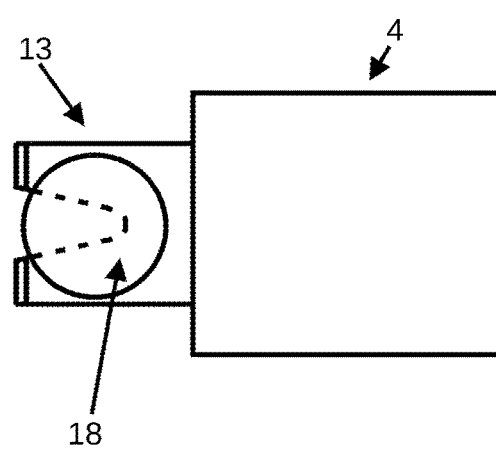
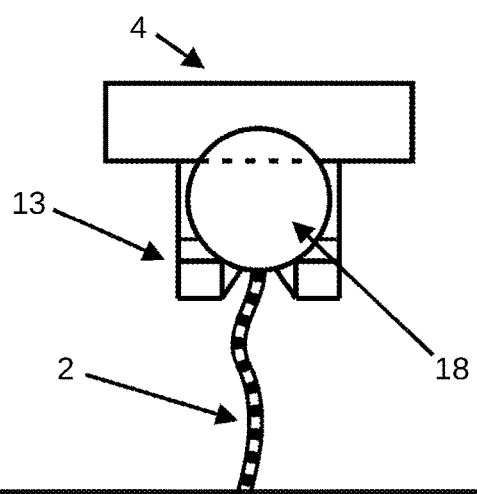

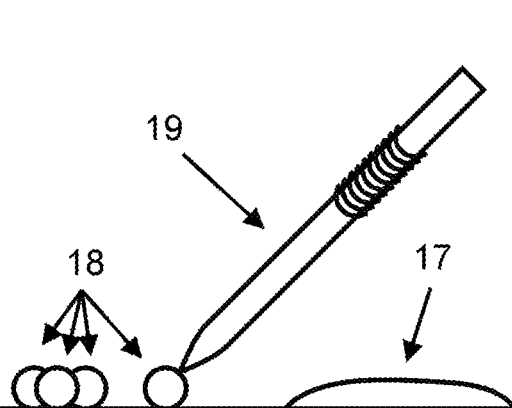
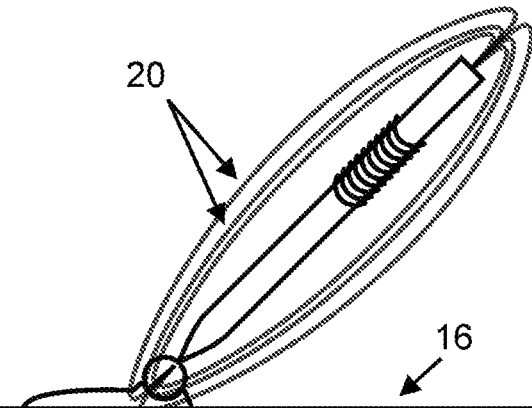
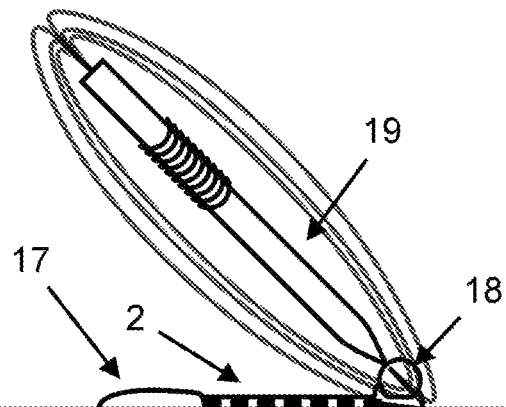
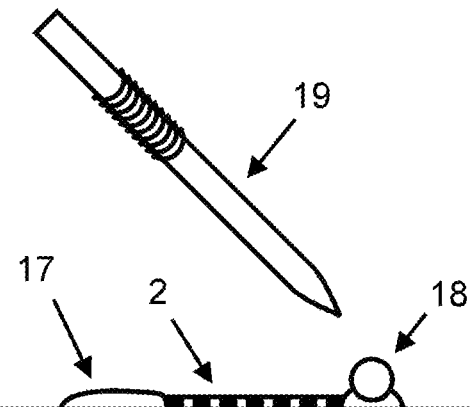

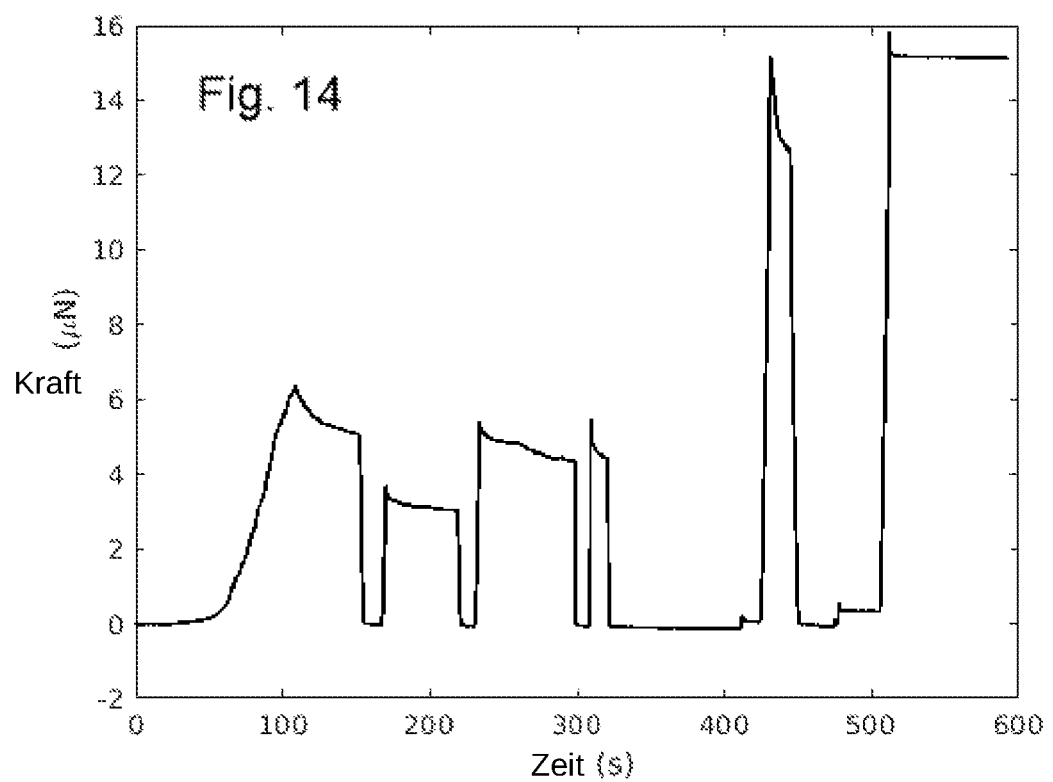

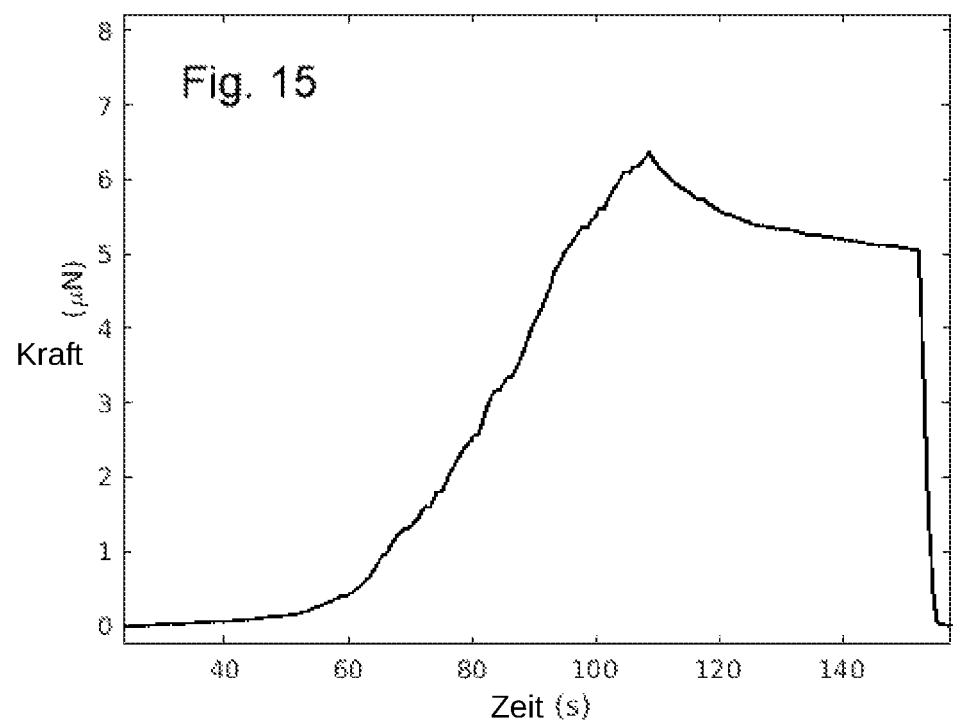

METHOD AND DEVICE FOR PREPARING A TENSILE TEST

CROSS REFERENCE TO RELATED APPLICATIONS

The present application is a U.S. National Phase of International Application No. PCT/AT2021/060199 entitled "METHOD AND DEVICE FOR PREPARING A TENSILE TEST," and filed on Jun. 8, 2021. International Application No. PCT/AT2021/060199 claims priority to Austrian Patent Application No. A 50500/2020 filed on Jun. 8, 2020. The entire contents of each of the above-listed applications are hereby incorporated by reference for all purposes.

TECHNICAL FIELD

The invention relates to a method for preparing a tensile test on an elongated, in particular fibrous specimen, for example on a collagen fibril, to a method for carrying out the tensile test and to a device for carrying out the tensile test.

BACKGROUND AND SUMMARY

As described by Rene B. Svensson et al in, Viscoelastic behavior of discrete human collagen fibrils" in J Mech Behav Biomed Mater. 2010 January; 3 (1): 112-5, collagenic materials form the majority of connective tissue and supportive tissue in human beings and other mammals and are therefore of enormous significance to the biomechanical integrity of the body. In these collagenic tissues, a hierarchical order can be distinguished. The individual planes of the hierarchy may have different mechanical properties. A tendon is an example of such a hierarchical collagenic structure with five planes: the whole tendon, the fascicle, the fibre bundle, the collagen fibrils and the collagen molecule. While the mechanical properties of the uppermost planes of the hierarchy have been the subject of investigations for decades, there is still little that is known about the fibril plane. In that article, Svensson et al suggested examining the mechanical properties of fibrils with the aid of an atomic force microscope (abbreviated to AFM). To this end, the fibrils are secured to an object holder at two points approximately 50 µm to 100 µm apart with the aid of epoxy adhesive. After drying the epoxy adhesive, one of these two points is released from the object holder using an AFM cantilever, so that one end of the fibril is securely connected to the object holder. The other end of the fibril can move freely and is provided with a further small droplet (approximately 10 µm in size) of epoxy adhesive. The freely movable end of the fibril is thereupon adhered to the cantilever, which in turn is secured to a piezo element of the AFM. The fibril is stretched by activating the piezo element. The deflection of the cantilever is detected with a laser detector. Knowing the deflection and the stiffness of the cantilever means that the stiffness of the fibril be calculated.

This prior art demonstrates that it is entirely possible to investigate the mechanical properties of elongated specimens such as collagen fibrils. However, the known method is difficult to put into practice. Conducting tensile tests on microscale and nanoscale fibres in a liquid medium is very difficult to carry out using that method. This is in particular due to the fastening of the fibres to the cantilever as described above. In Svensson et al's method for determining the mechanical properties of nanoscale fibres, the specimen is adhered to the force sensor with the aid of epoxy adhesive. This adhesive needs a very long time to cure; 18 hours is stated in Svensson et al. Because the force sensor has to be calibrated prior to adhesion and be securely clamped in the AFM, the known method cannot be parallelized. Thus, only two to three specimens per week can be investigated.

DE 2 525 479 A1 describes a different type of device for determining the tensile strength of metal foils. The metal foils are clamped between gripping clamps and held by gripping jaws.

Furthermore, other types of methods have been described by Savin Thierry et al, in "A method for tensile tests of biological tissues at the mesoscale", Journal of Applied Physics, Vol. 111, No. 7, 01.04.2012, and Chen Zhaoxi et al., "Measuring flexural rigidity of mullite microfibers using magnetic droplets", Journal of Applied Physics, Vol. 117, No. 21.

Thus, the objective of the present invention is to alleviate or overcome at least individual disadvantages of the prior art. In particular, the aim of the invention is to be able to investigate a plurality of elongated specimens at little expense.

This objective is achieved by means of a method for preparing a tensile test with the features of claim 1, a method for carrying out a tensile test with the features of claim 11 and a device for carrying out the tensile test with the features of claim 14. Preferred embodiments are defined in the dependent claims.

The method in accordance with the invention for preparing a tensile test on an elongated, in particular fibrous, specimen, for example on a collagen fibril, comprises at least the following steps, preferably in the given sequence:
 a. providing the elongated specimen,
 b. attaching a manipulating particle to the elongated specimen,
 c. providing a force sensor on which a retainer for the manipulating particle on the elongated specimen is arranged,
 d. manipulating the manipulating particle on the elongated specimen by means of a manipulating device, and
 e. connecting the manipulating particle on the elongated specimen to the retainer on the force sensor with the aid of the manipulating device.

In the invention, therefore, firstly, the manipulating particle is securely connected to the elongated specimen. Then the manipulating particle is moved with the manipulating device, in particular lifted, and is connected to the retainer on the force sensor. Preferably, an interlocking connection is provided between the manipulating particle and the retainer on the force sensor. In this manner, the connection between the manipulating particle and the retainer is free from adhesive. This has the additional advantage that the attachment of the manipulating particle to the retainer of the force sensor can be released in a reversible manner. This method means that advantageous manipulation of the elongated specimen can be carried out, avoids adhesion of the specimen to the force sensor and permits parallelization. In addition, a single force sensor may be used for the measurement of a large number of specimens, whereupon the accuracy of the measurement is increased and the specimens do not have to be dried before every force measurement.

Preferably, the manipulating particle is formed by a substantially rigid body, in particular from a unitary material, so that the manipulating particle essentially does not deform during manipulation with the manipulating device and when carrying out the tensile test with the force sensor, and in particular it does not stretch. The extent of the manipulating particle perpendicular to the longitudinal direction of the elongated specimen is preferably greater, in particular multiple times greater, than the diameter of the elongated specimen. This substantially facilitates manipulation of the manipulating particle.

In a preferred embodiment, the attachment of the manipulating particle to the elongated specimen comprises adhesion, for example with epoxy adhesive. By means of the adhesion, a secure connection is created between the manipulating particle and the elongated specimen, which enables the manipulating particle together with the elongated specimen to be received with the aid of the manipulating device and enables the manipulating particle together with the elongated specimen to be connected to the retainer of the force sensor. On the other hand, it is not necessary to adhere the elongated, in particular fibrous specimen to the force sensor. This has the substantial advantage that a plurality of elongated specimens can be prepared in parallel and investigated one after the other with the same force sensor.

In order to be able to make and break the connection between the manipulating device and the manipulating particle on the elongated specimen with little effort and high reliability, in a preferred embodiment, the manipulating particle is guided by means of a magnetic force between the manipulating device and the manipulating particle. In the connected state, the manipulating particle is guided exclusively with the manipulating device by means of the magnetic force. The magnetic force in this case is configured in a manner such that the manipulating particle on the elongated specimen can be lifted from the substrate, in particular from an object holder, using the manipulating device and inserted in the retainer on the force sensor. When the manipulating particle is inserted into the retainer on the force sensor, the magnetic connection is preferably contactless. Consequently, in this embodiment, the manipulating device is guided at a distance from the manipulating particle. In a preferred embodiment, the manipulating device comprises a magnet, in particular an electromagnet, and the manipulating particle comprises a magnetisable material which is attracted by the magnet. However, the manipulating device and the manipulating particle may also have mutually attracting magnets. Furthermore, the manipulating particle may have a magnet and the manipulating device may have a magnetisable material.

In a preferred embodiment, the manipulating device is a pair of magnetic tweezers, wherein the manipulating particle comprises a magnetisable material, in particular a neodymium alloy. The magnetisable material may also, however, be another ferromagnetic, ferrimagnetic, paramagnetic or superparamagnetic material. Magnetic tweezers are known in other contexts in the prior art. The magnetic tweezers preferably comprise a core, in particular produced from a soft magnetic mu-metal alloy, around which turns of a coil-type electromagnet in particular are preferably attached.

Furthermore, the manipulating device may be a microlitre or piston-operated pipette (PP), abbreviated to micropipette. The manipulating particles can be picked up with this micropipette.

In a preferred embodiment, a spherical element is provided as the manipulating particle. This embodiment has the advantage that selection of the size and shape of the manipulating particle is reproducible.

Preferably, the manipulating particle consists of a neodymium alloy, in particular in the form of an isotropically magnetized powder produced from a Nd—Pr—Fe—Co—Ti—Zr—B alloy. The spherical element preferably has a diameter of 30 micrometres ($\mu m$) to 50 $\mu m$.

In order to attach the manipulating particle to the elongated specimen, preferably a collagen fibril, in a preferred embodiment, the manipulating particle is dipped into an adhesive, in particular epoxy adhesive, with the aid of magnetic force and attached to the specimen. In this regard, the magnetic force must be greater than the force between the manipulating particle and adhesive, which can be ensured by a suitable selection of the materials. During attachment, the manipulating particle and the manipulating device are in physical contact. This contact is broken after attachment of the manipulating particle by turning off the magnetic field of the manipulating device. When using magnetic tweezers, the small magnetic remanence of the mu-metal alloy has the advantage of having a small magnetic force between the manipulating device and the manipulating particle, which means that it is possible to lift the manipulating device without the manipulating particle.

In order to test nanofibres or microfibres, preferably, a force sensor with a cantilever is used on which the retainer for the manipulating particle on the elongated specimen is provided. The deflection of the cantilever is in particular detected with an interferometer. Alternatively, the cantilever may be provided on an atomic force microscope. In this embodiment, the deflection of the cantilever may be measured with a laser beam which is reflected from the cantilever and is detected with a photodetector.

In order to be able to attach the manipulating particle rapidly and reliably to the retainer of the force sensor, in a preferred embodiment, the retainer comprises two prong elements with a recess between them, wherein the manipulating particle is inserted on the prong elements and the fibrous specimen is guided through the recess between the prong elements. The recess between the prong elements comprises a smaller maximum width than the manipulating particle, so that the fibrous specimen can be threaded into the recess between the prong elements and the manipulating particle can be placed on the top of the prong elements by means of the manipulating device. The recess may be V-shaped in plan view.

The manipulating device may be operated manually or with a robotic device.

So that the manipulating particle cannot inadvertently slip out of the retainer on the force sensor prior to the end of the tensile test, in a preferred embodiment, when the manipulating particle is in the state in which it is connected to the retainer, the manipulating particle is secured against slipping out of the retainer by means of prominences, in particular at the free ends of the prong elements.

In a preferred application, a nanofibre or microfibre, preferably a fibril, for example a collagen fibril, is provided as the elongated specimen. The diameter of the nanofibres or microfibres is preferably from 10 nm (nanometre) to 50 $\mu m$, in particular from 50 nm to 10 $\mu m$, for example from 100 nm to 300 nm.

For the purposes of this disclosure, the fibrous specimen may be both a single fibre, for example a single fibril, as well as a bundle of fibres, for example a bundle of fibrils.

The method described above can be used for the widest variety of applications. Thus, for example, the effects of cross-linking within the fibrils can be investigated, in particular in connection with diabetes, the healing of wounds, fibrosis and aging. Furthermore, the link between specific collagenic tissues and heart attacks, strokes, kidney disease, eye damage, lung fibroses, tearing of ligaments and tendons, scar formation and osteoporosis can be investigated. Furthermore, there is a large number of synthetic and natural nanofibres such as cellulose fibres, polymer fibres (electrospinning), silk or viscose, for which the present method could be used in order to determine the mechanical properties of these fibres.

In a preferred application, for example during the investigation of fibrils, it is advantageous, when in the state in which the fibrous specimen is connected to the retainer, the fibrous specimen is preferably located completely inside a liquid. In this manner, the tensile test can be carried out on the elongated specimen in the liquid. This has the advantage that the properties of fibrils or other biological fibres can be tested under physiological conditions.

In the method for carrying out a tensile test on an elongated, in particular fibrous specimen, at least the following steps are carried out:
  a. preparing the tensile test in accordance with one of the variational embodiments described above,
  b. carrying out the tensile test with the force sensor, wherein the fibrous specimen is stretched.

In order to stretch the elongated specimen, the force sensor can be moved over a specified distance with the aid of an adjusting element, for example a piezo element. Preferably, a deflection of a cantilever of the force sensor as a result of the manipulating particle attached thereto is detected. This embodiment has the particular advantage that a substantial stretching of the elongated specimen can be aimed at in order to test the elongated specimen to the point of failure. Alternatively, the position of the force sensor with respect to the cantilever may be fixed. In this embodiment, the end of the elongated specimen opposite to the manipulating particle could be fixed to an object holder, wherein the object holder is moved over a specified path with the aid of an adjusting element, for example with the aid of a piezo element.

When carrying out the tensile test with the force sensor, a force-displacement diagram or force-time diagram may be recorded.

Furthermore, the tensile test may be carried out by controlling the force and stretching using a control circuit. This means that dynamic mechanical testing is also possible.

After carrying out the tensile test, the fibrous specimen may be removed from the retainer on the force sensor with the aid of the manipulating device. For this, the manipulating particle is moved away from the force sensor with the aid of the manipulating device, in particular by means of a magnetic force between the manipulating device and the manipulating particle. In this manner, the force sensor can be released from the elongated specimen particularly rapidly and simply, in order to enable the tensile tests to be carried out on other elongated specimens. Advantageously, the test capacity can be substantially improved compared with the prior art.

The device in accordance with the invention for carrying out a tensile test on an elongated, in particular fibrous, specimen, for example on a collagen fibril, comprises a force sensor with a retainer for connection to a manipulating particle on the elongated specimen.

Preferably, the retainer of the force sensor is configured for connection to the manipulating particle in a reversible releasable manner, in particular an interlocking connection.

In order to prepare the tensile test, the manipulating particle on the elongated specimen is connected to the retainer of the force sensor.

In a preferred embodiment, the retainer of the force sensor has two prong elements with a recess between them. Seating surfaces for the manipulating particle are formed on the top of the prong elements. If the recess is narrower than the manipulating particle, then the fibrous specimen, but not the manipulating particle, can in fact pass through the recess. In this manner, the manipulating particle is entrained by the prong elements when the force sensor is moved during the tensile test. The length of the prong elements is preferably from 10 nm to 1 mm, in particular from 10 μm to 500 μm, for example substantially 100 μm.

In a preferred embodiment, the force sensor comprises a cantilever, wherein preferably, an interferometer is provided for the detection of a bending state of the cantilever.

BRIEF DESCRIPTION OF THE FIGURES

The invention will now be described in more detail with the aid of a preferred exemplary embodiment which is illustrated in the drawings.

FIGS. 2 to 7 show the sequence for the tensile test.

FIG. 8 shows a top view and FIG. 9 shows a front view of a detail of the device of FIG. 1.

FIGS. 10 to 13 diagrammatically show the preparation of the fibrous specimen for the tensile test in accordance with FIGS. 2 to 7.

FIG. 14 shows a force-time diagram which was recorded during a tensile test on a bundle of collagen fibrils.

FIG. 15 shows a section of the force-time diagram of FIG. 14.

DETAILED DESCRIPTION

Figure 1:
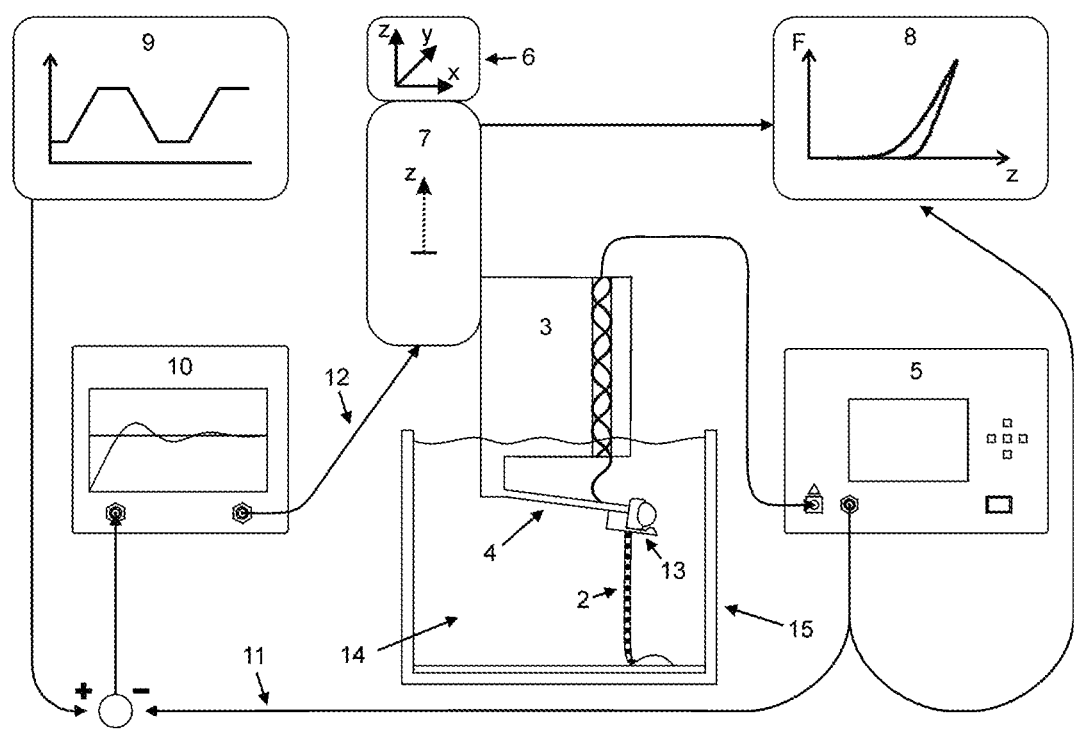
FIG. 1 shows a device in accordance with the invention for carrying out a tensile test on a fibrous specimen.

FIG. 1 diagrammatically shows a device 1 for carrying out a tensile test on a fibrous specimen 2, which is preferably a nanofibre or microfibre, in particular a fibril, for example a collagen fibril.

The device 1 comprises a force sensor 3 with a cantilever 4. A bending state, in this case a deflection, of the cantilever 4 can be detected with the aid of an interferometer 5. The force sensor 3 is connected to a positioning device 6 with which the force sensor 3 can be moved in all three directions in space, namely x, y, z. The positioning device serves for coarse positioning of the force sensor 3. Furthermore, an adjusting element 7, preferably a piezo element, for example a piezoelectric lever-amplified actuator, is provided, with which the force sensor is adjusted in order to carry out the tensile test, in this case backwards and forwards in the z direction. An output signal 8, in particular a force-displacement diagram or a force-time diagram, is generated from the signal from the adjusting element 7 and the interferometer 5. The tensile test is controlled via an input signal 9. In the embodiment shown, a control element 10 is additionally provided which forms a control signal 12 for the adjusting element 7 out of the input signal 9 and a feedback signal 11. In the embodiment shown, the force sensor 3 comprises a retainer 13 which—as will be described in detail below—is connected to the fibrous specimen 2 which is located in a liquid cell 15 filled with a liquid 14.

FIGS. 2 to 7 show the individual steps of the tensile test.

As can be seen in FIG. 2, the fibrous specimen 2 is arranged on an object holder 16 in the liquid cell 15. One end of the fibrous specimen 2 is fixed to the object holder 16 by means of an adhesive mass 17. The other end of the fibrous specimen 2 is provided with a manipulating particle 18 which is formed by a spherical element in the embodiment shown.

In the next step—FIG. 3—a manipulating device 19 is connected to the manipulating particle 18 on the fibrous specimen 2. In the embodiment shown, the manipulating device 19 and the manipulating particle 18 are coupled together magnetically. To this end, the manipulating device 19 may be a pair of magnetic tweezers which, when switched on, (see the symbolic magnetic field lines 20 in FIG. 2), attracts a magnetisable material, in particular a neodymium alloy, of the manipulating particle 18.

In the next step—FIG. 4—the manipulating particle 18 on the fibrous specimen 2 is connected to the retainer 13 of the force sensor 3 by moving the manipulating device 19.

In the next step—FIG. 5—the manipulating device 19 can be removed and the tensile test can be carried out. To this end, the adjusting element 7 can move the force sensor 3 with the cantilever 4 in accordance with the input signal 9. Because the manipulating particle 18 on the fibrous specimen 2 is connected to the retainer 13 of the force sensor 3, the fibrous specimen 2 is stretched by the movement of the force sensor 3, so that a force is exerted on the cantilever 4 of the force sensor 3. As described above, the deflection of the cantilever 4 is detected by interferometry in order to determine the force and stretching behaviour of the fibrous specimen 2.

As indicated in FIG. 6, the tensile test may be terminated by tearing failure of the fibrous specimen 2.

In the last step—FIG. 7—the manipulating particle 18 with a portion of the fibrous specimen 2 can be removed from the retainer 13 of the force sensor 3 with the aid of the manipulating device 19. Thus, the device 1 is ready for the next tensile test.

FIGS. 8 and 9 show in detail the connection of the manipulating particle 18 on the fibrous specimen 2 to the retainer 13 of the force sensor 3. Accordingly, the retainer 13 comprises two prong elements 21 between which a recess 22 is formed. The manipulating particle 18 is placed on the prong elements 21, whereas the fibrous specimen 2 is guided through the recess 22 between the prong elements. Prominences 23 are formed on the free ends of the prong elements 21, these prominences 23 secure the manipulating particle 18 against slipping out of the retainer 13.

FIGS. 10 to 13 illustrate the preparation of the fibrous specimen for the tensile test in accordance with FIGS. 2 to 7. In this regard, a manipulating particle 18 from a reservoir of manipulating particles 18 is provided with adhesive 17, in particular epoxy adhesive (FIG. 10), picked up with the manipulating device 19 (FIG. 11) and adhered to one end of the fibrous specimen 2 (FIG. 12), whereas the other end of the fibrous specimen 2 is disposed on the object holder 16 with adhesive 17. After the adhesive has cured, the end of the fibrous specimen which is adhered to the manipulating particle 18 is preferably released from the object holder with a fine needle-shaped tip. Finally, the fibrous specimen 2 with the manipulating particle 18 is ready for the tensile test (FIG. 13).

FIG. 14 shows a force-time diagram which was recorded with the device 1 described above during the tensile test on a collagen fibril bundle. According to this, the force due to the stretching of the collagen fibrils on the retainer 13 of the force sensor 3 is measured as the force sensor 3 is moved over the specified distances with the aid of the adjusting element 7. In the example shown, the collagen fibril bundle is stretched multiple times by different distances. On the far right, tearing of the collagen fibril during the final stretching is shown. FIG. 15 shows a section of the force-time diagram. It can be seen from the curves that the mechanical behaviour of the collagen fibrils deviate from elastic deformation which obeys Hook's Law. Both viscoelastic and viscoplastic behaviour can be detected with the present test device.

The invention claimed is:

1. A method for preparing a tensile test on an elongated specimen, with the steps of:
    providing the elongated specimen,
    attaching a manipulating particle to the elongated specimen,
    providing a force sensor on which a retainer for the manipulating particle on the elongated specimen is arranged,
    manipulating the manipulating particle on the elongated specimen by means of a manipulating device, wherein the manipulating device is a micropipette or a pair of magnetic tweezers, the manipulating particle has a magnetisable material, and the manipulating particle is guided by means of a magnetic force between the manipulating device and the manipulating particle, and
    connecting the manipulating particle on the elongated specimen to the retainer on the force sensor with the aid of the manipulating device, wherein an interlocking connection is provided between the manipulating particle and the retainer.

2. The method as claimed in claim 1, wherein the attachment of the manipulating particle to the elongated specimen comprises adhesion.

3. The method as claimed in claim 1, wherein a spherical element is provided as the manipulating particle.

4. The method as claimed in claim 1, wherein the force sensor has a cantilever on which the retainer for the manipulating particle on the elongated specimen is provided.

5. The method as claimed in claim 1, wherein the retainer has two prong elements with a recess between them, wherein the manipulating particle is placed on the prong elements and the specimen is guided through the recess between the prong elements.

6. The method as claimed in claim 5, wherein when it is in the state in which it is connected to the retainer, the manipulating particle is secured against slipping out of the retainer by means of prominences at free ends of the prong elements.

7. The method as claimed in claim 6, wherein the specimen is located in a liquid in the state in which the specimen is connected to the retainer.

8. The method as claimed in claim 1, wherein a nanofibre or microfiber is provided as the specimen.

9. A method for carrying out a tensile test on an elongated specimen, with the steps of:
    preparing the tensile test with the method as claimed in claim 1,
    carrying out the tensile test with the force sensor, wherein the specimen is stretched.

10. The method as claimed in claim 9, comprising
    recording a force-displacement diagram or force-time diagram when carrying out the tensile test with the force sensor.

11. The method as claimed in claim 9, wherein after carrying out the tensile test, the specimen is removed from the retainer on the force sensor with the aid of the manipulating device, wherein the specimen is fibrous.

12. A device for carrying out a tensile test on an elongated specimen comprising:
    a force sensor with a retainer for connection to a manipulating particle on the elongated specimen, wherein the container is configured for an interlocking connection to the manipulating particle; and
    a manipulating device for manipulating the manipulating particle, wherein the manipulating device is a micropipette or a pair of magnetic tweezers, the manipulating particle has a magnetisable material, and the manipulating particle is guidable by means of a magnetic force between the manipulating device and the manipulating particle.

13. The device as claimed in claim 12, wherein the manipulating particle on the elongated specimen is connected to the retainer of the force sensor.

14. The device as claimed in claim 12, wherein the retainer comprises two prong elements with a recess between them.

15. The device as claimed in claim 12, wherein the force sensor comprises a cantilever, wherein, an interferometer is provided for the detection of a bending state of the cantilever.

* * * * *